United States Patent
John, Jr.

[15] 3,694,061
[45] Sept. 26, 1972

[54] AUDIO-VISUAL APPARATUS
[72] Inventor: Robert S. John, Jr., Deerfield, Ill.
[73] Assignee: Bell & Howell Company, Chicago, Ill.
[22] Filed: April 16, 1971
[21] Appl. No.: 134,774

[52] U.S. Cl. .........................352/20, 352/22, 352/25
[51] Int. Cl. ..............................................G03b 31/04
[58] Field of Search...........352/19, 20, 22, 31, 92, 25

[56] References Cited

UNITED STATES PATENTS

| | | | |
|---|---|---|---|
| 3,539,248 | 11/1970 | Lancor | 352/19 X |
| 3,432,228 | 3/1969 | Hellmund | 352/92 UX |
| 3,578,852 | 5/1971 | Aldridge | 352/92 |

Primary Examiner—Samuel S. Matthews
Assistant Examiner—Michael L. Gellner
Attorney—William F. Pinsak, John E. Peele, Jr., Kenneth W. Greg and William K. Serp

[57] ABSTRACT

An apparatus for synchronizing an audio presentation with a visual display. During camera operation, the sprocket side of the film is exposed by a lamp which is energized upon actuation of the camera. After a predetermined amount of the film has been exposed, the lamp is extinguished and a tape recorder is started. During playback, the commencement of an opaque area along the sprocket margin of the film is sensed and utilized to actuate the recorder providing a synchronized sound accompaniment with the visual presentation.

6 Claims, 5 Drawing Figures

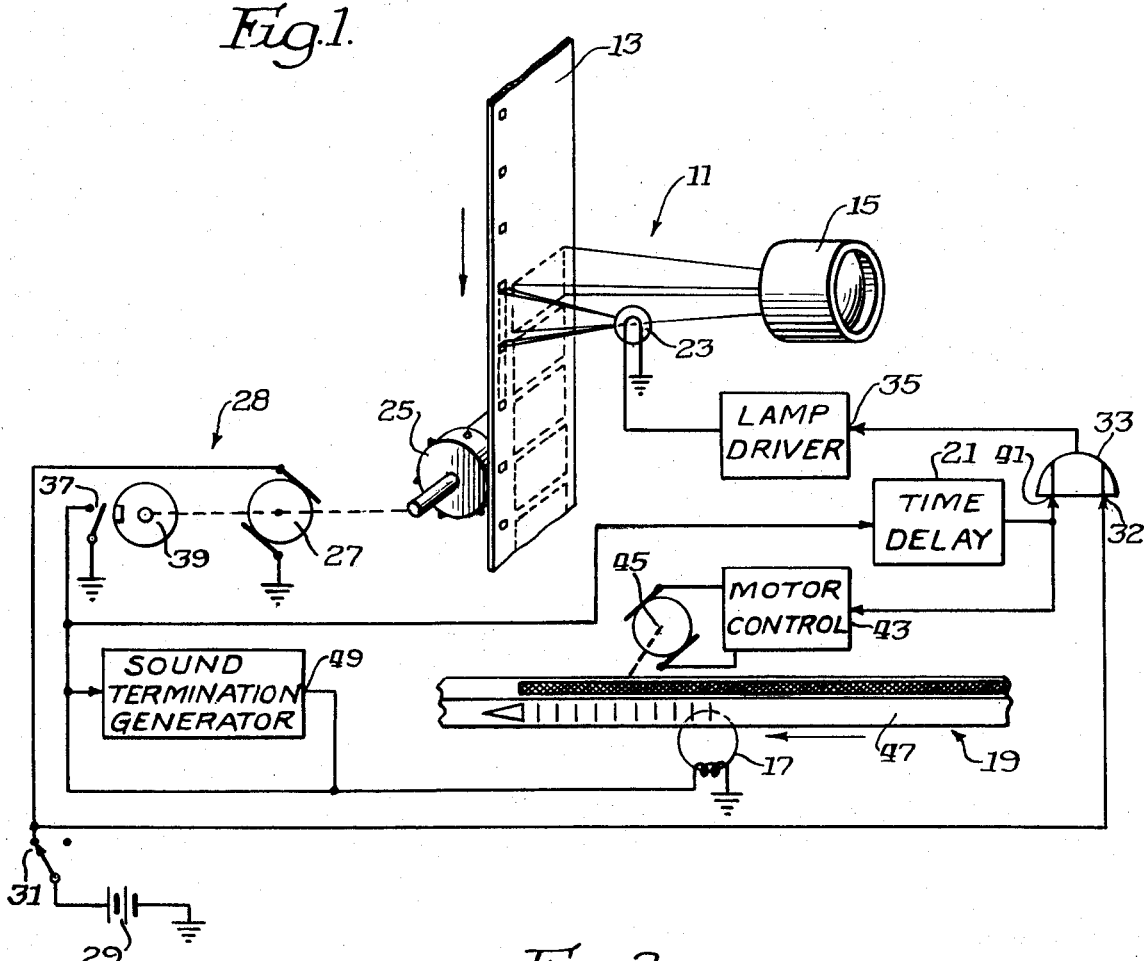
Fig.1.
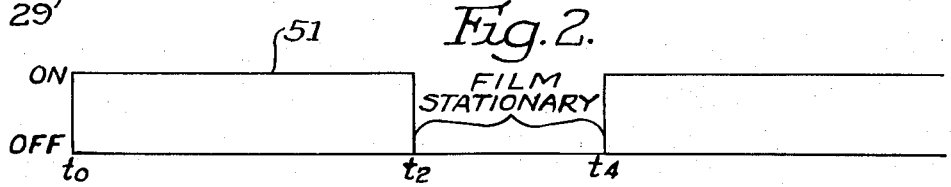
CAMERA
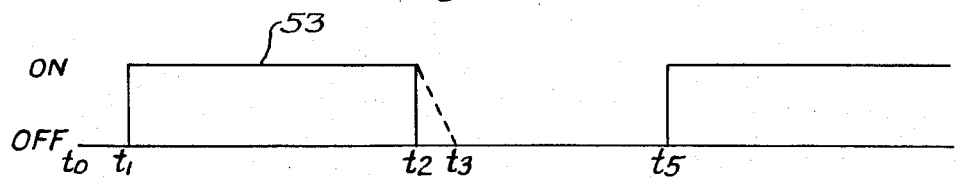
TAPE RECORDER
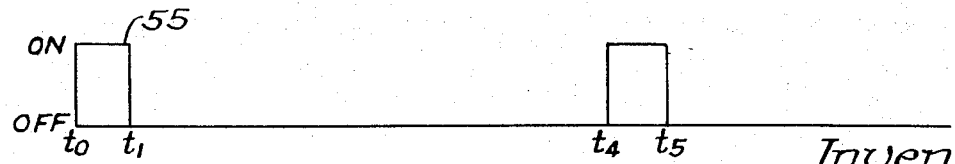
FILM EXPOSURE LIGHT
Inventor:
Robert S. John, Jr.

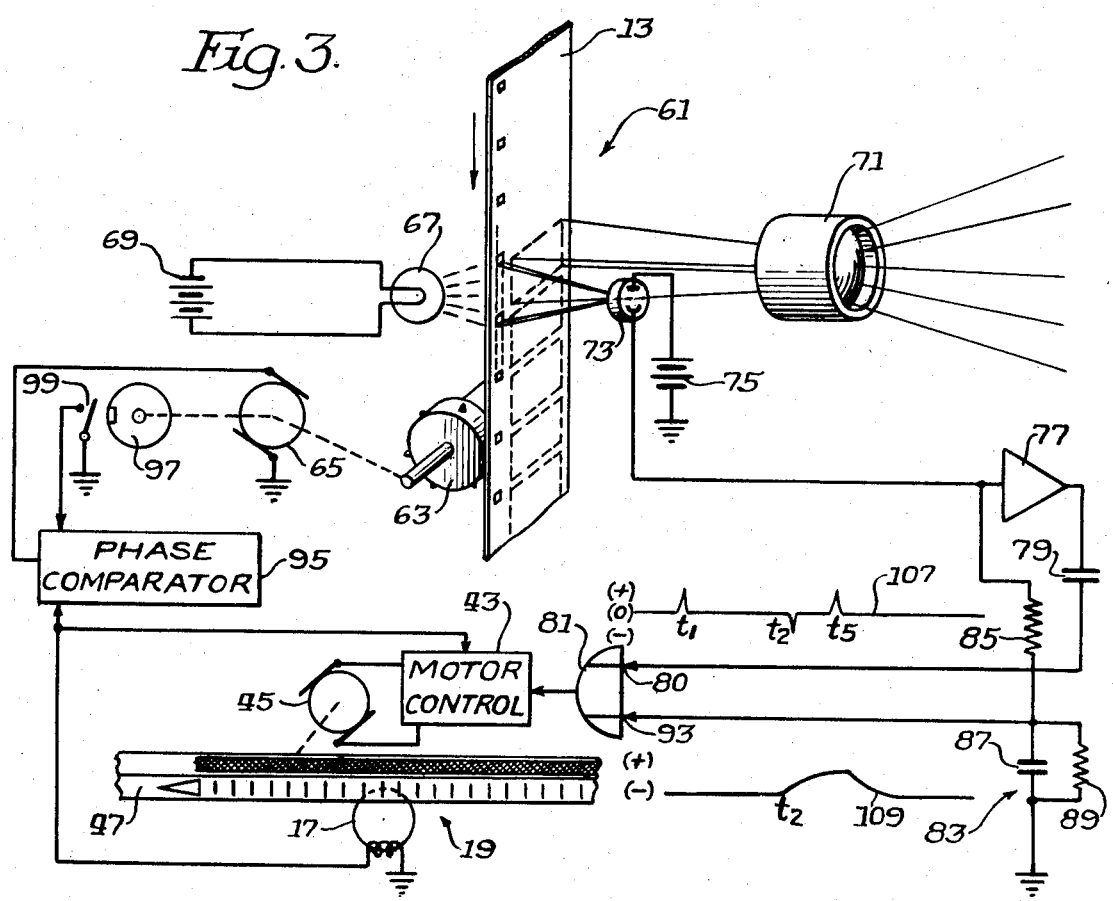
Fig. 3.
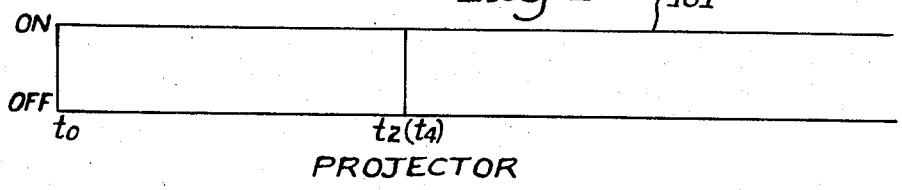
Fig. 4.
PROJECTOR
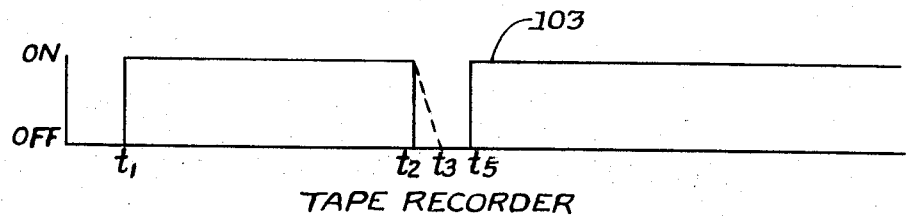
TAPE RECORDER
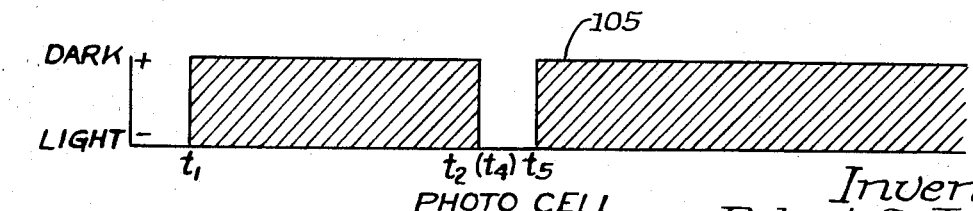
PHOTO CELL
Inventor:
Robert S. John, Jr.
By William F. ~~~~
William K. ~~~ Attys

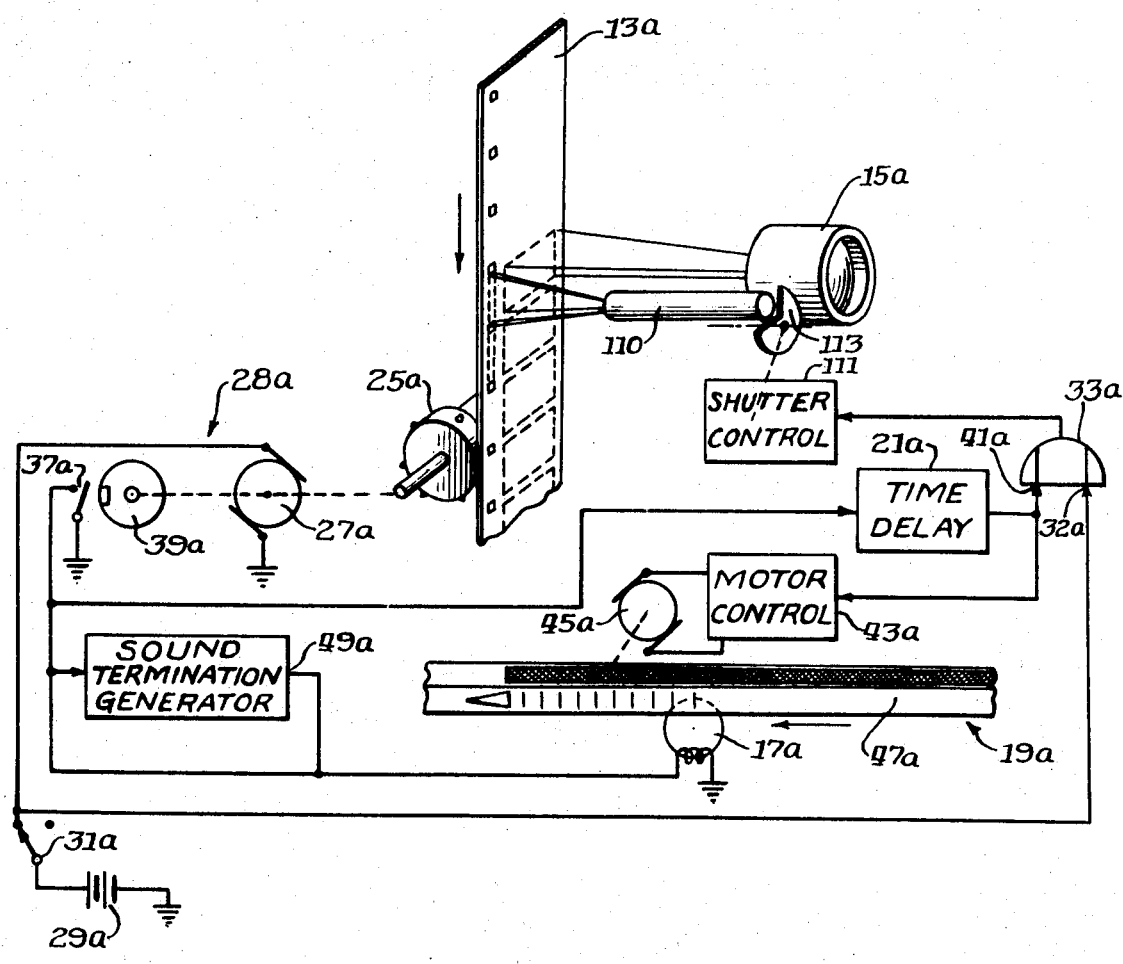

AUDIO-VISUAL APPARATUS

REFERENCE TO RELATED APPLICATIONS AND PATENTS

Additional information providing a more complete appreciation of the hereinafter described embodiments is provided in U.S. Pat. No. 3,539,218, issued Nov. 10, 1970, to Joseph H. Lancor and entitled AUDIO VISUAL RECORDING AND DISPLAY METHODS AND APPARATUS, as well as in U.S. Pat. No. 3,620,609, issued Nov. 16, 1971, to Robert S. John, Jr., and entitled SOUND RECORD CONTROL.

BACKGROUND OF THE INVENTION

This invention generally relates to an audio-visual display apparatus for providing an audio accompaniment synchronized with a pictorial display and more particularly relates to such an apparatus wherein control markings in the form of opaque areas are provided upon the film which serve to control the operation of the recorder.

Various arrangements have been proposed for synchronizing a sound accompaniment with a motion picture display. A particular approach adapted to amateur applications utilizes, during film exposure, a camera, a tape recorder and a control system for relating the recorder operation with the camera. Upon activation of the camera, the film drive motor advances the film as well as drives a pulse generator which emits one pulse for each frame advance. The pulses are fed to a start counter which generates an output signal after sensing a predetermined number of input pulses. After the lapse of a preset period of time corresponding to the passage of a fixed number of pulses, the output signal activates the tape recorder motor as well as triggers a light source mounted within the camera. The light source exposes the film along its sprocketless margin for a few frames thus producing a recorder start mark upon the film. Thereafter, the camera and recorder continue to operate and synchronization pulses generated by the camera are recorded upon a control track of the recorder. Upon release of the camera advance button, the camera stops and the cessation of the synchronization pulses is sensed by a recorder termination generator. Upon cessation of the sync pulses, the termination generator generates a stop signal burst which is recorded upon the control track as the recorder coasts to a stop.

During projection, the projector and recorder are connected to a control unit. The presence of the exposed film segment on the sprocket side of the film is sensed by a photocell and utilized to activate the recorder at the desired time. The synchronization signals recorded upon the control track are compared with similar signals generated by the projector which are related to the rate of film advancement through the projector. The control unit compares the two signals and generates a correction signal which brings the projector into synchronization with the recorder.

Prior devices have placed the control signal for activating the recorder upon the sprocketless side of the film in the form of a transparent marking. In prior art, the sprocketless side of the film is chosen to eliminate the possible sensing of spurious signals produced by the sprocket holes and the manufacturers markings which are also located upon the sprocket side of the film. However, the positioning of the control markings upon the sprocketless side of the film introduces certain disadvantages. This location precludes the application of a sound track upon the film since the sound striping interferes with and covers portions of the control markings. Further, in accordance with prior arrangements the signal light in the camera and the recorder motor are simultaneously energized. The start-up of the recorder motor together with the energization of the exposure lamp creates a considerable instantaneous battery drain which may interfere with rapid starting of the recorder.

It is a main object of this invention to provide a means for marking a photographic film which overcomes certain of the disadvantages of prior arrangements. Other objects and advantages of this invention will become obvious from the following description and drawings in which:

DESCRIPTION OF THE DRAWINGS

FIG. 1 is a symbolic diagram of a camera and recording apparatus including certain features of this invention.

FIG. 2 is a timing diagram of the apparatus illustrated in FIG. 1.

FIG. 3 is a symbolic diagram of a projector and an audio playback apparatus including certain features of this invention.

FIG. 4 is a timing diagram of the apparatus illustrated in FIG. 3; and

FIG. 5 is a symbolic diagram of an alternate embodiment of the apparatus illustrated in FIG. 1.

DESCRIPTION OF THE PREFERRED EMBODIMENT

With respect to FIG. 1, the film exposure apparatus briefly includes a camera 11 wherein a film 13 is intermittently driven across an exposure aperture (not shown) upon which is focused an objective lens 15 of the camera 11. A synchronization signal is generated by the camera 11 which provides a single pulse for each frame advance. The pulses are fed to a control head 17 of a tape recorder 19 and additionally serve to start the timing period of a time delay circuit 21 the output of which controls the energization of a lamp 23 which marks the film 13. Upon actuation of the camera, the film 13 is exposed for a short period of time after which the lamp 23 is extinguished and the tape recorder 19 starts. In this manner, the signal lamp 23 is energized and the film 13 exposed prior to energization of the tape recorder 19. It will be appreciated that the film is exposed only during those film segments which correspond to silent portions at the start of sound scenes.

More particularly, the objective lens 15 of the camera 11 is focused so as to direct the image of the object being photographed upon the surface of the film 13. The film 13 is driven by a sprocket 25 which is coupled to a direct current motor 27. Serving to supply power to the motor is a battery 29, one terminal of which is grounded and the remaining terminal of the battery is connected to a single-pole single-throw switch 31. Upon actuation of the camera switch 31, the motor 27 is energized and a signal is applied to one input of an AND gate 33. The AND gate 33 operates as a logic element which has na output only when both inputs receive the same signal level. The time delay 21 also starts and applies a signal to the other input 41 of the AND gate 33. The AND gate 33 produces an output signal which in turn actuates a lamp driver 35 energizing an incandescent light thereby exposing a portion of the film along the sprocket margin. In accordance with the illustrated embodiment, the lamp 23 is directed toward the sprocket hole margin of the film; however, if desired, the lamp may be directed to expose the alternate film margin.

The camera motor 27 also drives a synchronization pulse generating means 28 which comprises a reed switch 37 and a magnet 39 rotationally coupled to the drive shaft of the camera motor 27. As the motor rotates, the magnet is brought into proximity with the reed switch causing it to periodically close in accordance with the advance speed of the film. It has been found that a ratio of one-to-one between the film frame advance rate and the pulse rate generated by the pulse generating means is satisfactory although other integral ratios may be used. The output from the pulse generating means is fed to the counter time delay 21, which counts the pulses produced by the reed switch 37. After a predetermined number of pulses have been counted, the time-delay 21 turns off, removing the output signal to the alternate input 41 of the AND gate 33. It will be appreciated that at this time both AND gate inputs 32 and 41 receive non-equivalent signals thereby removing the output signal and thus de-energizing the lamp driver 35. The output signal from the counter time delay also serves to actuate a motor control circuit 43 energizing a tape recorder motor 45, which in turn starts the tape movement through the recorder 19.

As previously mentioned, the pulses from the reed switch 37 are also fed to the control head 17 which is positioned adjacent a control track 47 of the tape recorder thereby recording the pulses upon the magnetic tape of the recorder. The output pulses are additionally fed to a sound termination generator 49. This generator is constructed to provide a sound termination signal at its output upon a cessation of the input pulses. More specifically, no sound termination signal appears at the output of the generator 49 as long as the reed switch applies pulses to the generator input. The generator 49 provides a sound termination signal at its output when reed switch ceases applying pulses to the generator input which occurs when the film driving stops. Thus, when the camera switch is released, the camera motor 27 is de-energized which interrupts the pulse generator. Additionally, the motor control circuit turns off the tape recorder motor 45; however, due to inertia the recorder motor coasts to a stop rather than coming to an abrupt halt. Almost immediately upon cessation of the synchronization pulses, the sound termination generator 49 produces a tone burst signal which is recorded upon the control track of the audio tape by the control track recording head.

The operation of the apparatus illustrated in FIG. 1 can be more readily appreciated with reference to FIG. 2 wherein a timing diagram reading from left to right is illustrated for the camera, tape recorder, and the film exposure light indicated by the numerals 51, 53 and 55 respectively. It is assumed that the camera actuation button is depressed at time $T_0$, at that moment the camera motor is started for advancement of the film 13. Signals are also applied to the inputs of the AND gate actuating the lamp driver circuit 35 which energizes the lamp 23 exposing the film 13 along its sprocket margin. After a specified number of pulses have been counted by the counter time delay 21, which corresponds to the time period $T_0$–$T_1$, a signal to input 41 is removed from the AND gate 33 turning off the lamp driver 35. Thus, the film is exposed only during the period of time $T_0$–$T_1$.

At time $T_1$ the recording tape begins to advance, and the synchronization pulses produced by the pulse generating means 28 are recorded upon the control track 47 of the magnetic tape. At time $T_2$ the control switch for the camera is released and the film advance stopped. At this time, a sound termination signal is recorded upon the control tape and the recorder coasts to a stop which is reached at time $T_3$. Thus, the tape recorder coasts during the period $T_2$–$T_3$. Almost immediately at time $T_2$ the sound termination pulse is recorded upon the tape for purposes which will hereinafter be more fully described. From period $T_2$–$T_4$, the film and tape are stationary. To record a subsequent scene, the camera actuation button 31 is again depressed at $T_4$ activating the camera 11. At time $T_5$, the driver lamp is de-energized and the recorder started. It will be appreciated that the period of time which the time delay is set for, namely $T_0$–$T_1$ and $T_4$–$T_5$ is greater than the time $T_2$–$T_3$. This time relationship assures that the recorder, during playback, will coast to a complete stop before reactuation thereby assuring that synchronization from scene to scene is maintained during projection.

As previously mentioned, the film exposure light 23 is energized only during inoperative periods of the tape recorder. This feature is particularly desirable in that the main power source is required to supply power to either the tape recorder or the film light thus reducing the peak demand from the power source resulting in a more positive starting of the tape recorder 19. Further, as will be subsequently described, the recorder is started upon the presence of an opaque marking upon the film, rather than an exposed area as in prior arrangements. This particular feature allows the film margin along the sprocket holes to be used for carrying the control markings. Any spurious signals which might have been produced by the sprocket holes or processor's markings will have been washed out by the exposure light.

PROJECTOR

With respect to FIG. 3, the film 13, exposed in the manner previously described, is driven through a projector 61 by a sprocket drive 63 coupled to a motor 65. A projection light 67 connected to the terminals of a battery 69 serves to provide illumination which passes through the film and is focused upon a projection screen (not shown) by a projection lens 71. A portion of the light is passed through the margin of the film adjacent the sprocket holes. Serving to sense the control markings along the sprocket margin of the film is a photoresistive cell 73. One terminal of the photocell 73 is coupled through a battery 75 to ground and the remaining terminal of which feeds a control mark sensing means 83 and an inverting amplifier 77. The output of the amplifier is capacitively coupled through a coupling capacitor 79 to one input 80 of an AND gate 81. The control mark sensing means 83 further includes a resistor 85 one end of which is connected to the output of the photocell 73, and the other end of which is connected to a parallel RC network including a capacitor 87 and resistor 89. The remaining terminal of the RC network is connected to ground. The junction of the resistor 85 and the RC time delay network is connected to a remaining input 93 of the AND gate 81. The control mark sensing means 83 serves to prevent (for a short time period) spurious markings upon the film from reactuating the tape recorder after it has received the stop signal burst previously recorded upon the recorder tape. The AND gate 81 operates as a logic element which provides an output signal only when both of the input gates are fed with a positive signal with respect to ground. The output of the AND gate actuates the motor control unit 43 of the tape recorder which in turn energizes the motor 45 to control the movement of the tape through the recorder 19. A second input to the motor control unit is connected to the playback control head 17 of the tape recorder 19. Upon the occurrence of the stop signal burst, the recorder motor 45 is turned off.

The pulse output from the control head 17 of the tape recorder 19 is fed to a phase comparator 95 which controls the speed of the projector 61. Serving to provide a comparison signal indicative of the speed of the projection motor is a magnet 97 which is rotationally carried by the drive shaft of the motor 65. The magnet is periodically driven in proximity of a reed switch 99. One terminal of the switch is grounded and the switch 99 generates a pulse output for each frame advance of the film. The pulse output of the switch is compared with the pulse outputs of the recorder, and the resultant signal is used to control the speed of the projector motor so as to maintain synchronization between control signals on the control track of the recorder and the film advance through the projector.

The operation of the apparatus of FIG. 3 can be more readily appreciated with reference to FIG. 4 wherein its projector tape recorder and photocell operation are indicated by the numerals 101, 103 and 105 respectively. The projector 61 is started at time $T_o$ which corresponds to a transparent area upon the sprocket margin of the film. The light transmitted through the transparent film margin is sensed by the photoresistive cell 73 lowering its resistance and thereby feeding a direct current to the control mark sensing means 83, gradually charging capacitor 87 and thereby putting a positive signal into input 93 of AND gate 81. As the film passes through the projector at time $T_1$ an opaque marking occurs which is sensed by the photocell thereby raising its resistance and producing a negative going step signal. This negative step signal is passed through the amplifier and the leading edge of the resulting positive signal passes through the capacitor at $T_1$ providing a positive going pulse as illustrated in 107. The positive going pulse produces a signal at the input 80 of the AND gate which switches the motor control unit on, thereby actuating the tape recorder motor 45.

The tape recorder motor 45 continues to operate until time $T_2$. At time $T_2$ the opaque marking on the sprocket margin of the film terminates, creating a positive going step signal. This positive going step signal is inverted by the amplifier to form a negative going pulse. The positive going pulse is also coupled through the resistor 85 as illustrated at 109 causing the capacitor 87 of the RC network 83 to charge, thus creating a positive signal at the AND gate input 93. The presence of the negative signal at input 80 of the AND gate inhibits the output signal from the AND gate. At this time the stop burst recorded upon the tape of the recorder is sensed by the control head 17 and fed to the motor control unit 43 to turn off the recorder. It will be appreciated that the feeder discharge resistor 89 is selected so that a sufficient charge remains upon the capacitor 87 for a period of time greater than that required for the tape recorder to coast to a stop. This period of time is greater than the difference between times $T_2$ and $T_3$ which correspond to the coast time of the recorder. In the event a spurious transient should appear upon the film during the period $T_2$ and $T_3$, it will create a positive going pulse at input 80 of the AND gates. However, since the remaining AND gate input is not yet positively biased by the charge on the capacitor the signal will not create an output signal at the AND gate. Therefore, the recorder will not be switched on.

It will be noticed that the times $T_2$ and $T_4$ of FIG. 4 coincide. The camera and the recorder are stationary in this time period during exposure of the film, while during projection the film continuously moves through the projector. At time $T_5$ a second opaque area is sensed by the photoresistive cell 73 terminating the positive going step function and producing a positive going pulse at the output of the AND gate. The positive pulse again switches on the recorder motor 45. In this manner, the recorder is turned on in response to the start of an opaque area upon the film. As described, the illustrated embodiment of FIG. 3 includes a means for preventing turn-on of the tape recorder immediately after receiving a turn-off burst signal which might occur as a result of spurious markings upon the film.

ALTERNATE EMBODIMENT

With respect to the alternate embodiment illustrated in FIG. 5, those components which have a similar function and construction as those described in the preferred embodiment of FIG. 1 are provided with a similar numeral together with the subscript "a."

The embodiment of FIG. 5 provides an alternate means for obtaining the illumination for producing the exposed areas upon the film margin. This feature is obtained by means of a light transmitting optical bundle 110, one end of which is directed toward the sprocket margin of the film, and the other end of which is positioned to receive light reflected by the object being photographed. The optical bundle may be constructed of a suitable length of transparent plastic rod. Positioned adjacent the objective end of the optical bundle is a shutter actuated by a control unit. Upon actuation of the camera release button 31a a signal is applied through the AND gate 33a which energizes a shutter control 111 to open a shutter 113 thus permitting light from the scene to impinge upon the sprocket area of the film. The exposure of the film ceases after the time delay 21a has counted a predetermined number of pulses from the pulse generator 28a. The time delay 21a produces an output signal which inhibits the AND gate 33a thereby removing the signal from the shutter control 111. The shutter 113 closes obstructing the light to the film 13a. After processing the opaque areas along the sprocket margin of the film are sensed, and utilized to control the tape recorder 19a in a manner similar to that described in connection with FIG. 3.

Although a preferred and alternate embodiment of this invention have herein been shown and described it will be clear to those skilled in the art that various changes and modifications may be made without departing from the spirit and scope of the invention as set forth in the following claims.

What is claimed is:

1. An apparatus for providing a pictorial display together with a recorder providing sound accompaniment including a projector having a projection light and a film drive means, the improvement comprising a light sensitive means for sensing control means responsive to the output of said light sensitive means for preventing the reactuation of said recorder for a predetermined period of time after deactuation thereof.

2. In an apparatus for synchronizing a visual presentation with an audio accompaniment including a camera having a drive motor for advancement of the film therethrough and means for selectively actuating said camera, the improvement comprising:

a. a light source directed toward a margin of the film for selective exposure thereof;
   b. means for actuating said light source upon the commencement of advancement of the film;
   c. a pulse generator driven by the camera motor for providing a pulse output related to the advancement rate of the film through the camera; and
   d. means for deactuating said light source after expiration of a predetermined time interval, the termination of said interval corresponding to the commencement of the audio accompaniment, said deactuating means comprising a counter time-delay which receives the pulses from said pulse generator and serves to deactuate said light source after the count of a predetermined number of pulses.

3. The apparatus of claim 2 which further includes an audio recorder having a drive motor, a motor control means for actuating said drive motor, said time delay means being connected to said motor control means for actuation of said motor upon deactuation of said light source.

4. The apparatus of claim 2 wherein said light source includes a means for conducting light from the scene to be photographed toward the sprocket margin of the film.

5. The apparatus of claim 4 wherein said deactuation means comprises a shutter for selectively obstructing the scene illumination from said light conducting means and a counter time delay receiving the pulses from said pulse generator and provides an output signal after receipt of a predetermined number of said pulses so as to place said shutter into obstructing position with respect to said scene illumination.

6. The apparatus of claim 5 wherein the tape recorder includes a motor control means for actuating said tape drive motor, said delay means being connected to said motor control means for actuation of said tape drive motor upon closure of said shutter.

* * * * *